US009338755B2

(12) United States Patent
Nam

(10) Patent No.: US 9,338,755 B2
(45) Date of Patent: May 10, 2016

(54) APPARATUS AND METHOD FOR RADIOSONDE POWER CONTROL BASED ON POSITION ESTIMATION

(71) Applicant: ELECTRONICS AND TELECOMMUNICATIONS RESEARCH INSTITUTE, Daejeon (KR)

(72) Inventor: Hong Soon Nam, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 108 days.

(21) Appl. No.: 14/166,363

(22) Filed: Jan. 28, 2014

(65) Prior Publication Data

US 2014/0210636 A1   Jul. 31, 2014

(30) Foreign Application Priority Data

Jan. 30, 2013 (KR) .................. 10-2013-0010185

(51) Int. Cl.
*H04W 52/28* (2009.01)
*G01W 1/08* (2006.01)
*H04W 52/36* (2009.01)

(52) U.S. Cl.
CPC .............. *H04W 52/283* (2013.01); *G01W 1/08* (2013.01); *H04W 52/367* (2013.01); *Y02B 60/50* (2013.01)

(58) Field of Classification Search
CPC ... G01W 1/08; H04W 52/283; H04W 52/367; Y02B 60/50

USPC ........................................ 340/870.1; 455/522
See application file for complete search history.

(56) References Cited

U.S. PATENT DOCUMENTS

| 3,151,295 | A  | * | 9/1964  | Haviland ........................... 455/9  |
| 4,481,514 | A  |   | 11/1984 | Beukers et al. |
| 2003/0144019 | A1 | * | 7/2003  | Nelson et al. ................. 455/522 |
| 2005/0014499 | A1 | * | 1/2005  | Knoblach ................. B64B 1/40 455/431 |
| 2005/0173590 | A1 |   | 8/2005  | Andersson et al. |
| 2007/0272801 | A1 | * | 11/2007 | Hilliard et al. ................ 244/142 |
| 2010/0156663 | A1 |   | 6/2010  | Pal et al. |
| 2012/0257657 | A1 | * | 10/2012 | Subrahmanya et al. ...... 375/222 |

(Continued)

FOREIGN PATENT DOCUMENTS

KR  10-2012-0081295   7/2012

OTHER PUBLICATIONS

D.S. Song et al., "Remote sensing of atmospheric water vapor variation from GPS measurements during a severe weather event," *Earth Planets Space*, vol. 61, Nov. 2009, pp. 1117-1125.

(Continued)

*Primary Examiner* — Benjamin C Lee
*Assistant Examiner* — Stephen Burgdorf
(74) *Attorney, Agent, or Firm* — Staas & Halsey LLP

(57) ABSTRACT

Provided is an apparatus and method for radiosonde power control based on position estimation, including a radiosonde system including a radiosonde that may collect weather information, receive Global Positioning System (GPS) information, and transmit a signal including the collected weather information, and a receiver that may receive the signal, and the radiosonde may also recognize a current position based on the GPS information and control a transmission power based on a distance between the current position and a position of the receiver.

15 Claims, 6 Drawing Sheets

(56) References Cited

U.S. PATENT DOCUMENTS

| | | | |
|---|---|---|---|
| 2013/0141248 A1* | 6/2013 | Meskanen et al. | 340/870.1 |
| 2013/0163733 A1* | 6/2013 | Aerrabotu et al. | 379/93.17 |
| 2014/0009632 A1* | 1/2014 | Glover | 348/211.99 |
| 2014/0060174 A1* | 3/2014 | McCormick et al. | 73/170.28 |
| 2015/0122008 A1* | 5/2015 | Shimizu | 73/170.28 |

OTHER PUBLICATIONS

K.H. Kim et al., "The Performance Assessment of Special Observation Program (ProbeX-2009) and the Analysis on the Characteristics of Precipitation at the Ulleungdo," *Atmosphere: Korean Meteorological Society*, vol. 21, No. 2, 2011, pp. 185-196.

\* cited by examiner

| MOVING ROUTE | WHEN COMPARED TO BEING UNDER RELATIVELY NO POWER CONTROL |
|---|---|
| UNDER RELATIVELY NO POWER CONTROL [200 mW] | 1.0 |
| CASE 1 | 0.26 |
| CASE 2 | 0.32 |
| CASE 3 | 0.49 |

APPARATUS AND METHOD FOR RADIOSONDE POWER CONTROL BASED ON POSITION ESTIMATION

CROSS-REFERENCE TO RELATED APPLICATION

This application claims the priority benefit of Korean Patent Application No. 10-2013-0010185, filed on Jan. 30, 2013, in the Korean Intellectual Property Office, the disclosure of which is incorporated herein by reference.

BACKGROUND

1. Field of the Invention

The present invention relates to an apparatus and method for controlling power of a radiosonde used for aerological observation and thus, reducing power consumption of the radiosonde.

2. Description of the Related Art

A radiosonde is used for aerological observation and has a function of observing weather conditions including temperature, humidity, pressure, position, and the like, in upper layers of the atmosphere after being suspended from a balloon and elevated into the air, and of transmitting the observed data to a receiver on the ground. The radiosonde includes weather sensors such as a barometer, a thermometer, and a hygrometer for aerological observation, a Global Positioning System (GPS) receiver for position estimation, and a wireless transmitter for transmitting observed data. A general method of elevating the radiosonde is suspending the radiosonde from a balloon injected with a light gas, for example, helium, although an alternative method of dropping a parachute attached with the radiosonde from an airplane also exists.

For example, Korean Patent No. 10-2010-0133106, published on Dec. 12, 2010, titled "Atmosphere Lower Ascent and Descent Observation Experimental Tool" discloses a lower atmosphere ascent and descent observation tool including "a floating balloon, a balloon ascent unit winding or unwinding a connection string connected to the balloon to raise the balloon, a cable tensionmeter for measuring a tension of the connection string connected to the balloon, a radiosonde connected to the connection string between the balloon and the balloon ascent unit to observe atmospheric states, the radiosonde comprising an observation sensor for observing and a global positioning system (GPS) chip for transmitting a position signal of the balloon onto the ground, and a GPS antenna for receiving signals observed by the observation sensor and the position signal of the GPS chip at the ground."

Forms of radiosondes described in the foregoing may be elevated to an altitude of 35 kilometers (km) above ground level after being elevated from the elevator on the ground, despite horizontal movement based on a wind direction or a wind speed. The radiosonde may transmit weather information observed at regular intervals, for example, at 1 second intervals, while being elevated into an upper atmosphere, to a receiver on the ground. In order to perform the preceding, it is necessary for the radiosonde to satisfy weight requirements, a maximum transmission distance, and an operating time. For example, the radiosonde is required to receive information from a distance of 200 km or more, in consideration of a distance to be traversed, to supply a sufficient amount of power to receive radiosonde data for more than 2 hours, and to have a power weight of 140 grams (g) or less. Therefore, power control technology is necessary to effectively control power consumption of the radiosonde.

Also, radiosondes may be elevated twice per day, simultaneously around the world, to observe upper atmospheric weather conditions, and fall to the ground after the balloon bursts. However, once elevated, a radiosonde may be discarded, rather than being recovered, resulting in environmental pollution. In order to reduce such environmental pollution, minimizing a battery capacity of the radiosonde is necessary.

Further, a radio signal may be propagated in various directions and accordingly, cause a radio interference in adjacent electronic devices and increase a range of signals to be received by a receiver of the radiosonde on the ground. Therefore, a function of controlling a transmission power is necessary to prevent transmission of an extremely strong signal.

SUMMARY

The present invention provides an apparatus and method for radiosonde power control based on position estimation that may effectively control power consumption of a radiosonde.

The present invention also provides an apparatus and method for radiosonde power control based on position estimation that may maximize a battery life and reduce a battery capacity of a radiosonde.

The present invention also provides an apparatus and method for radiosonde power control based on position estimation that may reduce environmental pollution caused by a radiosonde.

According to an aspect of the present invention, there is provided a radiosonde system, including a radiosonde to collect weather information, receive Global Positioning System (GPS) information, and transmit a signal including the collected weather information, and a receiver to receive the signal. The radiosonde may recognize a current position based on the GPS information and control a transmission power based on a distance between the current position and a position of the receiver.

The radiosonde may verify a power control status of the radiosonde and control, by referring to the verified power control status, the transmission power based on the distance of the current position and the position of the receiver.

The power control status may be shifted, based on an altitude of the radiosonde, to at least one of an initial status, a flight status, and a drop status.

The radiosonde may shift the power control status to the flight status when a current altitude is higher than a flight threshold and a previous altitude, and to the drop status when the current altitude is lower than a drop threshold and equal to the previous altitude.

When the power control status is the initial status, the radiosonde may transmit the signal, using a predetermined initial status transmission power. When the power control status is the flight status, the radiosonde may control the transmission power based on a calculation of a distance from the receiver. When the power control status is the drop status, the radiosonde may transmit the signal, using a predetermined transmission drop status power.

The initial status transmission power and the drop status transmission power may be set to be lower than a flight status transmission power.

The radiosonde may estimate the current position based on the GPS information, every predetermined transmission power update cycle, calculate a distance from the estimated current position to the receiver, and calculate the transmission power based on the calculated distance.

The radiosonde may compare the calculated transmission power to a predetermined maximum transmission power.

When the calculated transmission power is less than or equal to the maximum transmission power, the radiosonde may transmit the signal, using the calculated transmission power. When the calculated transmission power is greater than the maximum transmission power, the radiosonde may update the maximum transmission power based on an elapsed period of time after the radiosonde is elevated and an expected period of time during which the radiosonde is expected to operate.

The radiosonde may compare the elapsed period of time to the expected period of time. When the elapsed period of time is less than the expected period of time, the radiosonde may set the calculated transmission power to be the maximum transmission power. When the elapsed period of time is greater than or equal to the expected period of time, the radiosonde may increase the maximum transmission power.

The position of the receiver may be set to be a position inputted previously in an internal memory or a position recognized, based on the GPS information, as the position of the receiver in the initial status, or automatically set after the power control status is shifted to the flight status.

According to another aspect of the present invention, there is provided a radiosonde including a weather sensor to collect weather information, a GPS receiver to receive GPS information, a transmitter to transmit a signal including the collected weather information, and a power controller to recognize a current position based on the GPS information and control a transmission power of the transmitter based on a distance between the current position and a receiver receiving the signal.

According to still another aspect of the present invention, there is provided a method of controlling a power of a radiosonde, including collecting weather information by the radiosonde using a weather sensor, recognizing a current position based on GPS information received by a GPS receiver, and controlling a transmission power of a transmitter based on a distance between the current position and a receiver receiving a signal including the weather information transmitted from the radiosonde.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
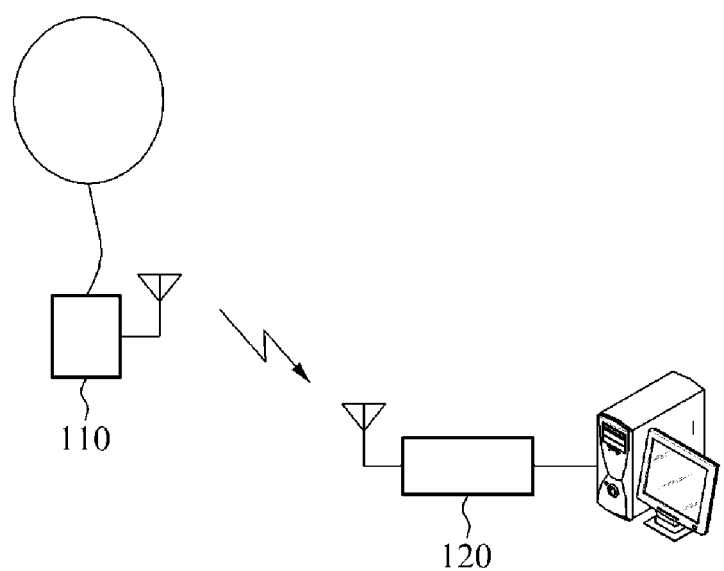
FIG. 1 is a conceptual diagram illustrating a radiosonde system according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the accompanying drawings, however, the present invention is not limited thereto or restricted thereby.

When it is determined a detailed description related to a related known function or configuration that may make the purpose of the present invention unnecessarily ambiguous in describing the present invention, the detailed description will be omitted. Also, terminology used herein is defined to appropriately describe the exemplary embodiments of the present invention and thus may be changed depending on a user, the intent of an operator, or a custom. Accordingly, the terminology must be defined based on the following overall description of this specification.

FIG. 1 is a conceptual diagram illustrating a radiosonde system according to an embodiment of the present invention.

Referring to FIG. 1, the radiosonde system may include a radiosonde 110 and a receiver 120, used for aerological observation.

The radiosonde 110 may be elevated into the air, observe upper atmospheric weather conditions, and transmit a result of the observation. The radiosonde 110 may be elevated into air through being suspended from a balloon injected with a light gas, for example, helium. Here, during elevation into the air, the radiosonde 110 may observe weather at regular intervals, recognize a current position, and transmit a result of the observation to the receiver 120 on the ground.

In order to observe upper atmospheric weather conditions and transmit the observation data to the receiver 120 on the ground, the radiosonde 110 may include a weather sensor to collect weather information, a Global Positioning System (GPS) receiver to receive GPS information, a transmitter to transmit a signal including the weather information collected by the weather sensor, and a power supply to supply power to the radiosonde 110. Here, the radiosonde 110 may use a battery as the power supply.

The ground receiver 120 may receive the signal transmitted from the radiosonde 110, analyze weather conditions of upper air, and predict weather. The radiosonde 110 may be elevated to an altitude approximately 35 kilometers (km) above ground level, although a moving route of the radiosonde 110 may be changed based on a wind direction or a wind speed because the radiosonde 110 may be elevated through being suspended from a balloon. Thus, the receiver 120 may need to normally receive the signal even from a distance greater than 200 km from ground level.

After completing weather observations and dropping to the ground, the radiosonde 110 may be discarded rather than recovered. A battery of the radiosonde 110, after discarded, may be a significant cause of environmental pollution and thus, reducing a battery capacity may be a necessary measure to improve environmental pollution caused by the radiosonde 110.

Also, the transmitter is a component consuming the greatest amount of power in the radiosonde 110. Thus, improving power consumption of the transmitter may reduce a battery weight and a battery capacity.

The radiosonde 110 may reduce power consumption by controlling a transmission power based on a distance between a current position and a position of the receiver 120, after recognizing the current position based on the GPS information. Accordingly, the battery capacity of the radiosonde 110 may be reduced, along with environmental pollution subsequent to use.

Figure 2:
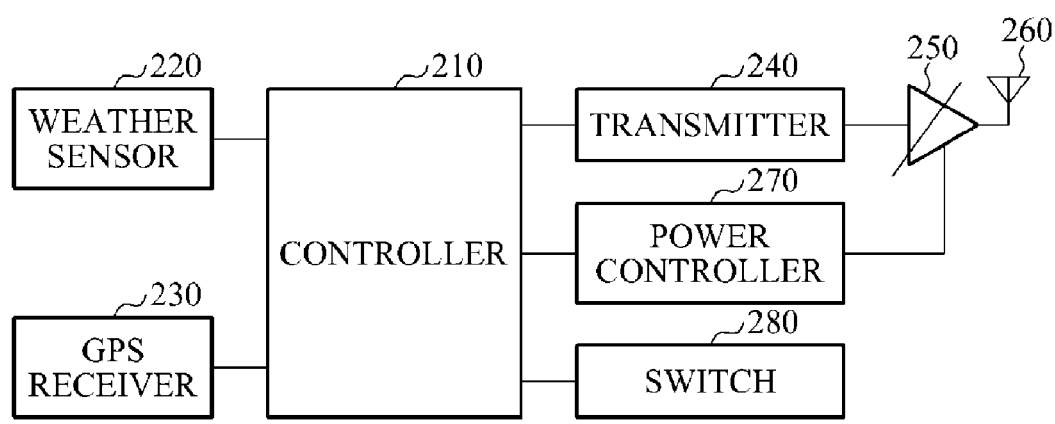
FIG. 2 is a block diagram illustrating a radiosonde according to an embodiment of the present invention.

FIG. 2 is a block diagram illustrating a radiosonde according to an embodiment of the present invention.

Hereinafter, the radiosonde will be described in greater detail by referring to FIG. 2. Referring to FIG. 2, the radiosonde may include a controller 210, a weather sensor 220, a GPS receiver 230, a transmitter 240, a power amplifier 250, an antenna 260, a power controller 270, and a switch 280.

The controller 210 may control overall operations of the radiosonde that may collect weather information, receive GPS information, and transmit a signal including the collected weather information to a receiver on the ground.

The weather sensor 220 may collect the weather information by measuring temperature, humidity, pressure, and the like.

The GPS receiver 230 may receive the GPS information from a GPS satellite and recognize a current position of the radiosonde.

The transmitter 240 may transmit the signal including the weather information collected by the weather sensor 220 to the receiver on the ground.

The power amplifier 250 may amplify power based on a level of a transmission power calculated by the power controller 270 and control an intensity of the signal transmitted from the transmitter 240.

The antenna 260 may radiate the signal transmitted from the transmitter 240 and controlled by the power amplifier 250.

The power controller 270 may control the transmission power to enable the receiver on the ground to stably receive the signal. Here, the power controller 270 may control the transmission power based on a power control status of the radiosonde and a distance between the radiosonde and the receiver. The power controller 270 may reduce the transmission power when the distance between the radiosonde and the receiver is relatively short, and increase the transmission power when the distance is relatively long.

The power controller 270 may verify the power control status of the radiosonde and, when the power control status is a flight status, the power controller 270 may control the transmission power based on the current position and the position of the receiver. Although the controller 210 and the power controller 270 are illustrated separately in FIG. 2, the controller 210 and the power controller 270 of the radiosonde, according to an embodiment of the present invention, may be configured in an integrated type. Also, the radiosonde may include a battery (not shown) to supply power to the radiosonde and a memory (not shown) to store position information of the receiver.

The switch 280 may be a component to set the position of the receiver. The position of the receiver may be set to be a position currently recognized by GPS during flight or stored in the memory. Once the position of the receiver is set, the position of the receiver may not be shifted to an initial status again.

Figure 3:
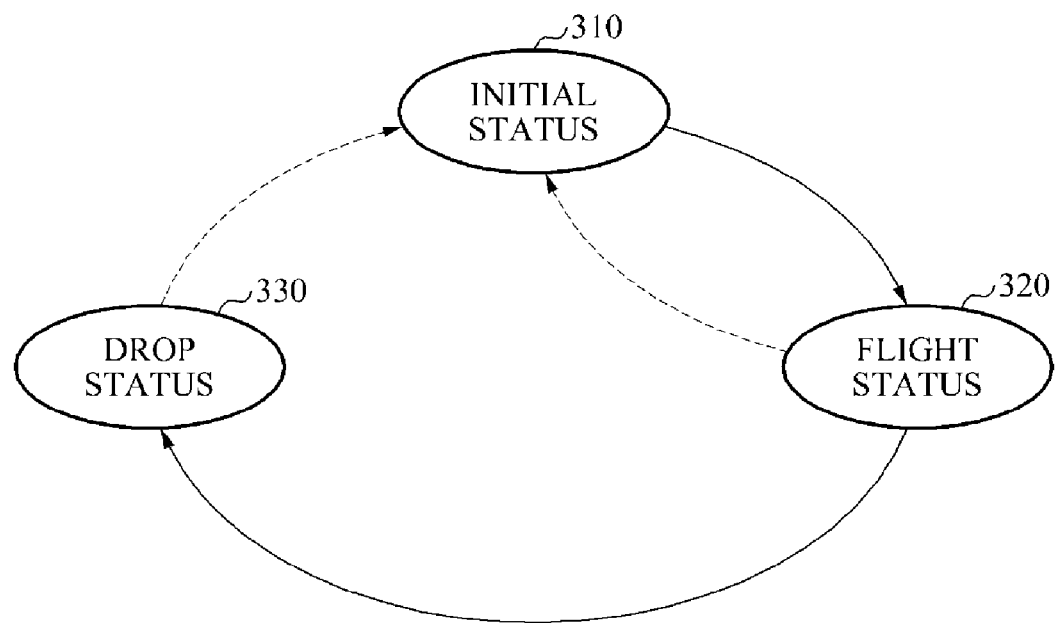
FIG. 3 illustrates a status shift for radiosonde power control according to an embodiment of the present invention.

FIG. 3 illustrates a status shift for radiosonde power control according to an embodiment of the present invention.

In order to control a transmission power ($P_{out}$), the radiosonde may be shifted to an initial status 310, a flight status 320, and a drop status 330.

When power is supplied, the radiosonde may be shifted to the initial status 310. In the initial status 310, the radiosonde may be initialized based on a program of a controller (microcontroller unit, MCU), and collect weather information by a weather sensor after the initialization. Also, the radiosonde may recognize a current position by a GPS receiver and transmit, using a predetermined initial status transmission power ($P_0$), a signal including the collected weather information.

Here, when the radiosonde is elevated to an altitude higher than a flight threshold and a current altitude is higher than a previous altitude, the radiosonde may shift a power control status to the flight status 320. In the flight status 320, the radiosonde may calculate a distance from a receiver and update a transmission power based on the calculation.

When the radiosonde is elevated lower than a drop threshold and the current altitude is equal to the previous altitude, the radiosonde may shift the power control status to the drop status 330. In the drop status 330, the radiosonde may transmit the signal, using a predetermined drop status transmission power ($P_d$).

Setting the transmission power to be low in the initial status 310 and the drop status 330 may reduce a radio interference affecting other adjacent electrical devices. In the flight status 320, the radiosonde may transmit the signal, using a low power, when the distance between the radiosonde and the receiver is relatively short, and increase the transmission power as the distance increases, to enable stable reception of the signal by the receiver.

The radiosonde may be reset to the initial status 310 from the flight status 320 and the drop status 330, as a need arises.

Figure 4:
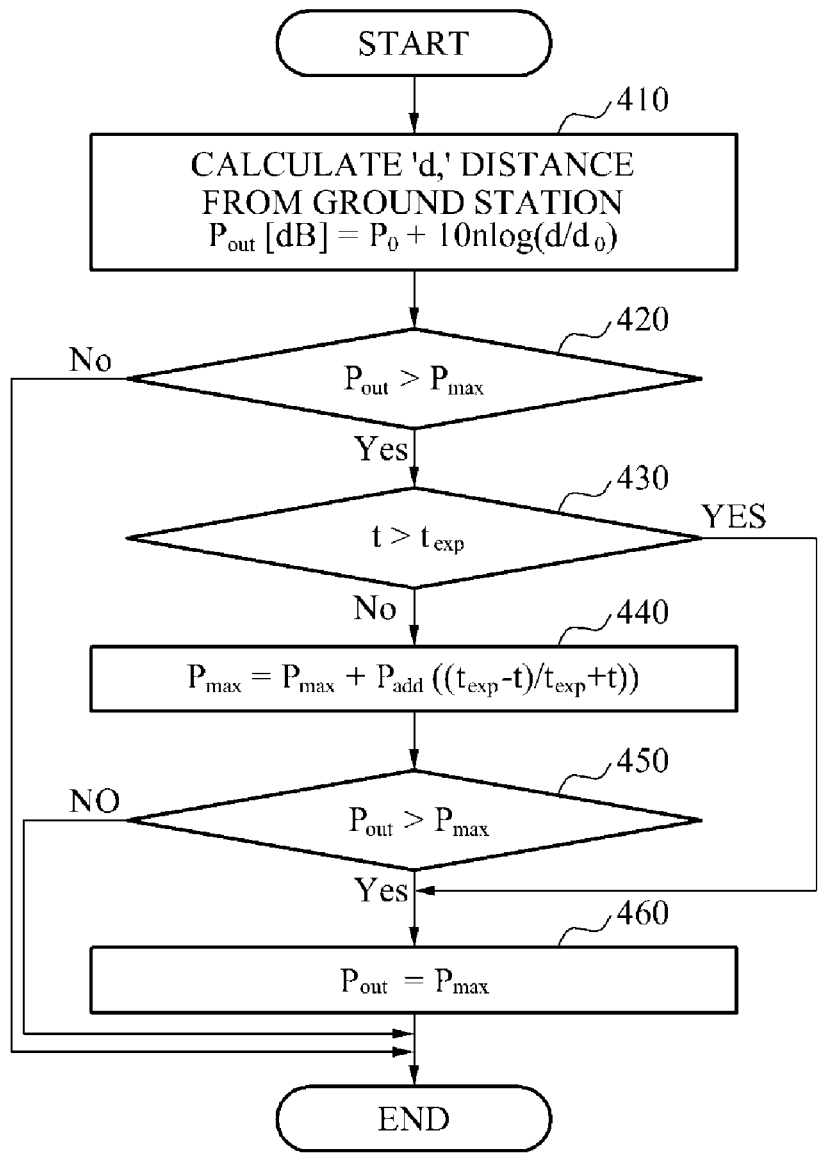
FIG. 4 is a flowchart illustrating a process of calculating a transmission power of a radiosonde according to an embodiment of the present invention.

FIG. 4 is a flowchart illustrating a process of calculating a transmission power of a radiosonde according to an embodiment of the present invention.

The radiosonde may update the transmission power, every predetermined transmission power update cycle. The transmission power update cycle may be set to be greater than or equal to a cycle in which a GPS receiver recognizes a current position. In operation 410, when the transmission power update cycle approaches, the radiosonde may estimate the current position based on GPS information, calculate a distance (d) from the estimated current position to a receiver, and calculate, using the calculated distance (d), the transmission power. For example, the transmission power ($P_{out}$) may be calculated based on Equation 1.

$$P_{out} = P_0 + 10n\log\left(\frac{d}{d_0}\right) \quad \text{[Equation 1]}$$

Here, "$P_0$," "$d_0$," and "n" denote an initial power, a reference distance, and a constant, respectively. In general, a value of n is an integer from 2 to 4

In operation 420, the radiosonde may compare the calculated transmission power ($P_{out}$) to a predetermined maximum transmission power ($P_{max}$). When the calculated transmission power ($P_{out}$) is less than or equal to the maximum transmission power ($P_{max}$), the calculated transmission power ($P_{out}$) may be determined to be the transmission power. However, in operation 430, when the calculated transmission power ($P_{out}$) is greater than the maximum transmission power ($P_{max}$), the radiosonde may compare an elapsed period of time (t) after elevation of the radiosonde to an expected period of time ($t_{exp}$) during which the radiosonde is expected to operate. In operation 440, when the elapsed period of time (t) is less than the expected period of time ($t_{exp}$), the radiosonde may set the calculated transmission power ($P_{out}$) to be the maximum transmission power ($P_{max}$), or when the elapsed period of time (t) is greater than or equal to the expected period of time ($t_{exp}$), the radiosonde may update the maximum transmission power ($P_{max}$), based on Equation 2.

$$P_{max} = P_{max} + P_{add}\left(\frac{t_{exp} - t}{t_{exp} + t}\right) \quad \text{[Equation 2]}$$

Here, "$t_{exp}$" denotes an expected period of time and "$P_{add}$" denotes a maximum power available for additional use by a transmitter.

The radiosonde may fly farther over a short period of time, due to a strong wind, after elevation. In this case, the radiosonde may deviate a range in which signal reception is stable, although the radiosonde may have a sufficient residual supply of power in a battery. Such a case may be used to extend a transmission distance by increasing a transmission power to facilitate an easier signal reception by the receiver.

Figure 5:
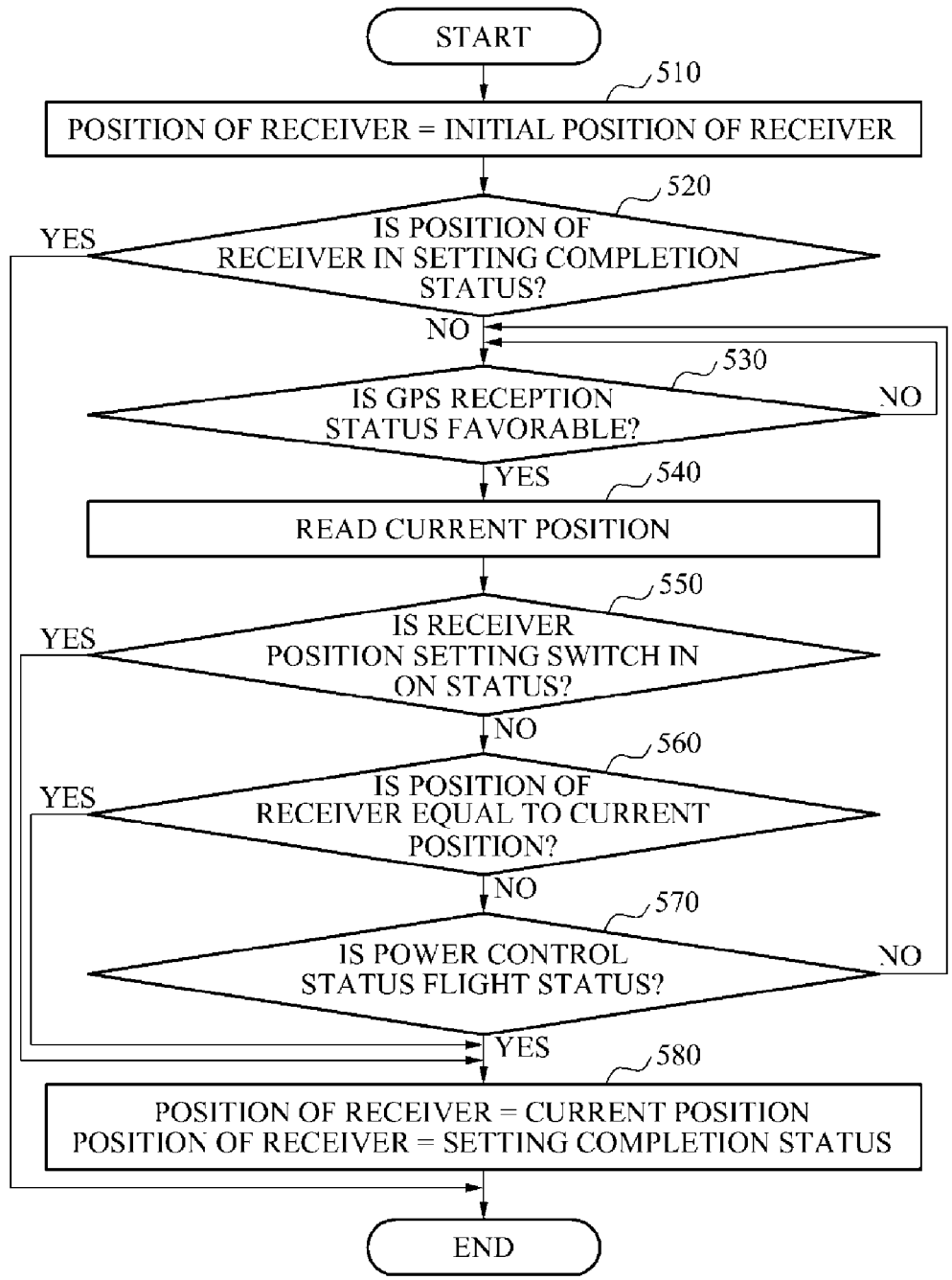
FIG. 5 is a flowchart illustrating a process of setting a position of a receiver for a radiosonde according to an embodiment of the present invention.

FIG. 5 is a flowchart illustrating a process of setting a position of a receiver for a radiosonde according to an embodiment of the present invention.

Since a transmission power of the radiosonde may be calculated based on a distance between the radiosonde and the receiver, it is necessary for the radiosonde to be informed of the position of the receiver in advance. Generally, the receiver may be operated in a fixed position and thus, the position of the receiver may be set in an initial status of the radiosonde. In this case, the position of the receiver may be stored in an internal memory in advance by a manufacturer or a supplier, or set to be a position currently recognized by a GPS receiver. The position of the receiver may be automatically set in a position recognized by the GPS receiver immediately after the radiosonde is shifted to a flight status.

As shown in FIG. 5, in operation 510, the radiosonde may set a current position to be an initial position of the receiver when power is supplied. To perform the operation 510, the initial position of the receiver and a receiver position setting status should be set in a setting completion status in the internal memory. In operation 520, the radiosonde may determine whether the receiver position setting status is in the setting completion status. When the receiver position setting status is not in the setting completion status, the radiosonde may await a favorable condition of a GPS reception status. When the GPS receptation status is determined to be in a favorable condition in operation 530, the radiosonde may read the current position recognized by the GPS receiver in operation 540, after which, the radiosonde may investigate a receiver position setting switch. When the switch is in an on status in operation 550, the radiosonde may set the position of the receiver to be the current position and the receiver position setting status to be the setting completion status.

However, when the switch is in an off status, the radiosonde verifies the current position. When the current position is equal to the initial position of the receiver in operation 560, the radiosonde may set the current position to be the position of the receiver and the receiver position setting status to be the setting completion status.

Also, when the current position is not equal to the initial position of the receiver, the radiosonde may verify whether a power control status is a flight status, in operation 570. When the power control status is the flight status, the radiosonde may set the position of the receiver to be the current position and the receiver position setting status to be the setting completion status, in operation 580. As an alternative, the radiosonde may repeat the process of reading the current position after re-verification of the GPS reception status.

The switch may be turned on when an operator determines that position recognition of the GPS receiver is stable during the flight of the radiosonde. When the switch is turned off, a current position immediately after a shift to the flight status may be automatically set to be the position of the receiver.

Figure 6:
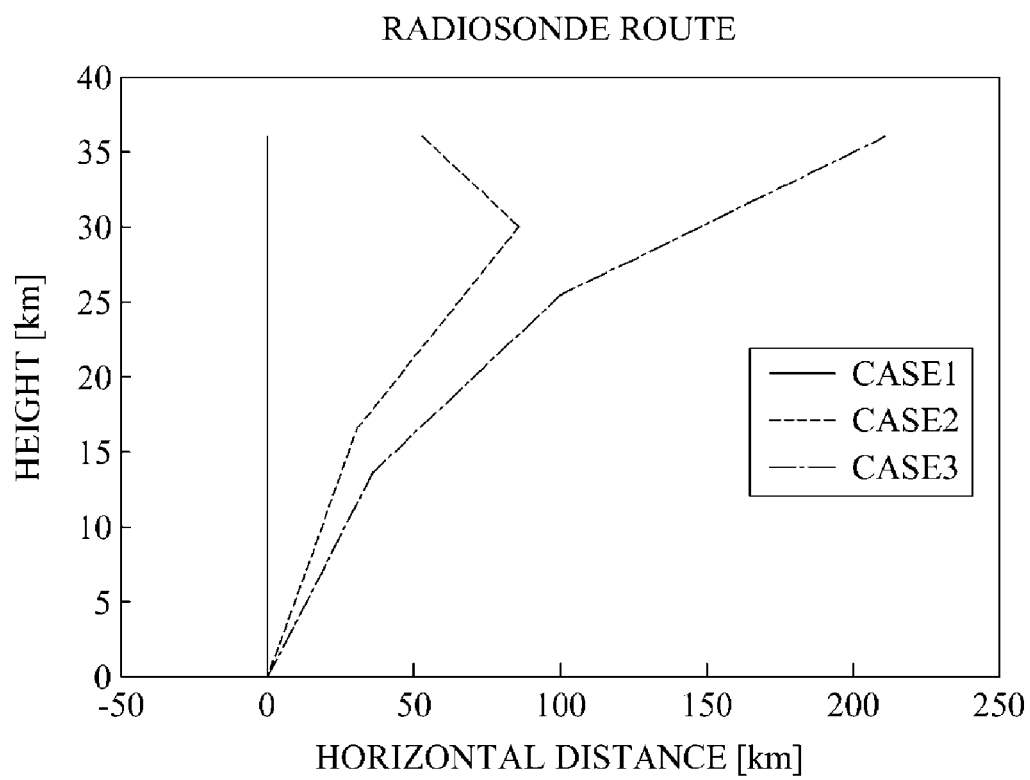
FIG. 6 illustrates an evaluation of power consumption based on a moving route of a radiosonde according to an embodiment of the present invention.

FIG. 6 illustrates an evaluation of power consumption based on a moving route of a radiosonde according to an embodiment of the present invention.

The radiosonde may be elevated to an altitude 35 km above ground level for approximately 2 hours. In this case, the radiosonde may ascend perpendicular to the ground and move horizontally. To investigate a power saving effect according to an embodiment of the present invention, FIG. 6 illustrates an example comparing three moving routes of the radiosonde, in the presence of power control and the absence of power control.

Case 1 of FIG. 6 represents a case in which the radiosonde ascends perpendicularly. Cases 2 and 3 of FIG. 6 represent cases in which the radiosonde moves horizontally due to a wind direction and a wind speed. As a result of simulations based on the three moving routes, case 1, case 2, and case 3 reduced power consumption by values of 0.26, 0.32, and 0.49, respectively, in the presence of power control according to an embodiment of the present invention, as compared to the absence of power control. Based on the result, it is confirmed that power consumption may be reduced by at least 50%.

Furthermore, it is also confirmed that, when the power control is performed according to an embodiment of the present invention, a battery weight and capacity may be reduced and environmental pollution caused by discarding the battery after use may be reduced. In a number of simulations, "n" was set to a value of 2, and an initial power, a maximum power, and an additional maximum power were set to be 60 milliwatts (mW), 200 mW, and 40 mW, respectively. Further, when an initial status or a drop status transmission power is set to be low, an interference affecting other adjacent electronic devices may be reduced by a corresponding amount.

According to an embodiment of the present invention, a radiosonde may control a transmission power based on a distance from a receiver and thus, minimize a radio interference affecting other adjacent electronic devices and reduce a level of an input signal of the receiver.

An effective control of the transmission power based on the distance of the radiosonde and the receiver may extend a battery life and reduce a battery capacity.

Reduction of the battery capacity may reduce environmental pollution caused by a discarded radiosonde.

The above-described exemplary embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A radiosonde system, comprising:
a radiosonde to observe weather information, receive Global Positioning System (GPS) information, and transmit a signal comprising the observed weather information wherein the radiosonde periodically:
recognizes and estimates a current position based on the GPS information,
calculates a distance from the estimated current position to a receiver to receive the signal,
calculates a transmission power based on the calculated distance,
controls the transmission power based on the distance between the current position and the position of the receiver,
compares the calculated transmission power to a predetermined maximum transmission power, and:
when the calculated transmission power is less than or equal to the maximum transmission power, the radiosonde transmits the signal using the calculated transmission power, and
when the calculated transmission power is greater than the maximum transmission power, the radiosonde updates the maximum transmission power based on an elapsed period of time after the radiosonde is elevated and an expected period of time during which the radiosonde is expected to operate.

2. The radiosonde system of claim 1, wherein the radiosonde verifies a power control status of the radiosonde and controls the transmission power, by referring to the power control status, based on the distance between the current position and the position of the receiver.

3. The radiosonde system of claim 2, wherein the power control status is shifted, based on an altitude of the radiosonde, to at least one status of an initial status, a flight status, and a drop status.

4. The radiosonde system of claim 3, wherein when a current altitude is higher than a flight threshold and a previous altitude, the radiosonde shifts the power control status to the flight status, and
when the current altitude is lower than a drop threshold and equal to the previous altitude, the radiosonde shifts the power control status to the drop status.

5. The radiosonde system of claim 2, wherein when the power control status is an initial status, the radiosonde transmits the signal using a predetermined initial status transmission power,
when the power control status is a flight status, the radiosonde controls the transmission power based on a calculation of a distance from the receiver, and
when the power control status is a drop status, the radiosonde transmits the signal using a predetermined drop status transmission power.

6. The radiosonde system of claim 5, wherein the initial status transmission power and the drop status transmission power are set to be lower than a flight status transmission power.

7. The radiosonde system of claim 1, wherein the radiosonde compares the elapsed period of time to the expected period of time, and when the elapsed period of time is less than the expected period of time, the radiosonde sets the calculated transmission power to be the maximum transmission power, and
when the elapsed period of time is greater than or equal to the expected period of time, the radiosonde increases the maximum transmission power.

8. The radiosonde system of claim 1, wherein the receiver to receive the signal has a known position, and wherein the known position of the receiver is set to be a position input in an internal memory in advance or a position recognized, based on the GPS information, as the position of the receiver in an initial status, or is automatically set after a power control status is shifted to a flight status.

9. A radiosonde, comprising:
a weather sensor to collect weather information;
a Global Positioning System (GPS) receiver to receive GPS information;
a transmitter to transmit a signal comprising the collected weather information; and
a power controller to periodically:
recognize and estimate a current position based on the GPS information,
calculate a distance from the estimated current position to a receiver receiving the signal,
calculate a transmission power based on the calculated distance,
control the transmission power of the transmitter based on the distance between the current position and the position of the receiver,
compare the calculated transmission power to a predetermined maximum transmission power, and:
when the calculated transmission power is less than or equal to the maximum transmission power, transmit the signal using the calculated transmission power, and
when the calculated transmission power is greater than the maximum transmission power, update the maximum transmission power based on an elapsed period of time after the radiosonde is elevated and an expected period of time during which the radiosonde is expected to operate.

10. The radiosonde of claim 9, wherein the power controller verifies a power control status and controls the transmission power, by referring to the power control status, based on the distance between the current position and the position of the receiver, and
wherein the power control status is shifted, based on an altitude of the radiosonde, to at least one status of an initial status, a flight status, and a drop status.

11. The radiosonde of claim 10, wherein when a current altitude is higher than a flight threshold and a previous altitude, the power controller shifts the power control status to the flight status, and
when the current altitude is lower than a drop threshold and equal to the previous altitude, the power controller shifts the power control status to the drop status, and
wherein when the power control status is the initial status, the transmitter transmits the signal using a predetermined initial status transmission power,
when the power control status is the flight status, the transmitter transmits the signal based on a distance from the receiver, and
when the power control status is the drop status, the transmitter transmits the signal using a predetermined drop status transmission power.

12. The radiosonde of claim 9, wherein the power controller estimates the current position based on the GPS information, every predetermined transmission power update cycle, calculates a distance from the estimated current position to the receiver, and calculates the transmission power based on the calculated distance.

13. The radiosonde of claim 9, further comprising:
a switch to set the position of the receiver to be a position recognized, based on the GPS information, as the position of the receiver in an initial status, or automatically set the position of the receiver to be a position recognized as the position of the receiver after a power control status is shifted to a flight status.

14. A method of controlling a power of a radiosonde, the method comprising periodically:
collecting weather information by the radiosonde using a weather sensor;
recognizing and estimating a current position based on Global Positioning System (GPS) information received by a GPS receiver;
calculating a distance from the estimated current position to a receiver receiving a signal comprising the weather information transmitted from the radiosonde;
calculating a transmission power based on the calculated distance;
controlling the transmission power of a transmitter based on the calculated distance between the current position and the receiver;
comparing the calculated transmission power to a predetermined maximum transmission power, and:
when the calculated transmission power is less than or equal to the maximum transmission power, transmitting the signal using the calculated transmission power, and
when the calculated transmission power is greater than the maximum transmission power, updating the maximum transmission power based on an elapsed period of time after the radiosonde is elevated and an expected period of time during which the radiosonde is expected to operate.

15. The method of claim 14, wherein the controlling further comprises:
verifying a power control status of the radiosonde;
estimating the current position based on the GPS information per predetermined transmission power update cycle when the power control status is a flight status;
calculating a distance from the estimated current position to the receiver; and
calculating the transmission power based on the calculated distance.

\* \* \* \* \*